US010963101B2

(12) United States Patent
Suto et al.

(10) Patent No.: US 10,963,101 B2
(45) Date of Patent: Mar. 30, 2021

(54) INPUT DETECTION DEVICE AND INPUT DETECTION METHOD

(71) Applicant: ALPINE ELECTRONICS, INC., Tokyo (JP)

(72) Inventors: Shunichi Suto, Iwaki (JP); Ken Ono, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/922,168

(22) Filed: Jul. 7, 2020

(65) Prior Publication Data
US 2021/0011576 A1  Jan. 14, 2021

(30) Foreign Application Priority Data
Jul. 12, 2019  (JP) .............................. JP2019-130010

(51) Int. Cl.
*G06F 3/041* (2006.01)
(52) U.S. Cl.
CPC .................. *G06F 3/0418* (2013.01)

(58) Field of Classification Search
CPC ..................... G06F 3/0418; G06F 2203/04105
See application file for complete search history.

(56) References Cited

FOREIGN PATENT DOCUMENTS

| JP | 2009-163363 | 7/2009 | |
|----|----|----|----|
| JP | 2014-142813 | 8/2014 | |
| KR | 20170141012 A | * 12/2017 | ........... G06F 3/0414 |

* cited by examiner

*Primary Examiner* — Michael Pervan
(74) *Attorney, Agent, or Firm* — Brinks Gilson & Lione

(57) ABSTRACT

An input detection device performs a transition to a special mode in a case where application of a pressing force to a pressing detectable area is detected before a contact on a contact detectable area is detected, monitors whether or not a predetermined condition set in the special mode is satisfied in a case where a contact is detected after the transition to the special mode, and validates the detected contact when the predetermined condition is satisfied. Therefore, the input detection device does not validate the contact unless an intentional operation in which the contact is continuously made until the predetermined condition is satisfied is performed in a case where the contact is detected in a state in which application of a pressing force is detected.

20 Claims, 10 Drawing Sheets

AREA SURROUNDED BY [⋯] ... CONTACT DETECTABLE AREA 8
AREA SURROUNDED BY [⋯] ... PRESSING DETECTABLE AREA 11
AREA INTERPOSED BETWEEN [⋯] AND [⋯] ... FRAME PORTION FRONT SURFACE AREA 10

INPUT DETECTION DEVICE AND INPUT DETECTION METHOD

RELATED APPLICATION

The present application claims priority to Japanese Patent Application Number 2019-130010, filed Jul. 12, 2019, the entirety of which is hereby incorporated by reference.

BACKGROUND

1. Field of the Invention

The present invention relates to an input detection device and an input detection method, and particularly, is suitable for use in an input detection device that detects a contact and a pressing force.

2. Description of the Related Art

Conventionally, an input detection device has been known that, when a user performs a touch operation on a graphical user interface (GUI) or the like displayed on a display with a touch panel, detects a contact on the touch panel and a pressing force of the contact and determines that the contact is valid only when the pressing force is equal to or more than a threshold value, rather than immediately determining that the contact is valid when the contact is detected. By performing the detection of the pressing force, in addition to the determination of validity/invalidity of the contact, the contact can be validated only when the user performs a pressing operation of pressing a target, as if pushing the target, and the user is requested to perform an accurate operation, thereby suppressing occurrence of misoperations.

Note that JP 2009-163363 A discloses an input device configured to perform a predetermined operation by detecting a contact on a touch panel and a pressing force. That is, the input device described in JP 2009-163363 A includes a display unit that displays an image, a touch panel that is disposed overlappingly on an upper surface of a display surface of the display unit, and a pressure sensor that is disposed overlappingly on a lower surface of the display surface of the display unit. The input device performs a first operation by detecting a contact on the touch panel, and performs a second operation by detecting a contact on the touch panel and a pressure applied to the pressure sensor.

Further, JP 2014-142813 A discloses a technology in which a press sensor is provided at a position to which a press force is applied when a user grips a casing, the position being a side portion of a portable terminal such as a smartphone, and in a case where a signal output from a touch panel is invalid, the signal is validated only when a press detection value is detected in a predetermined manner by the press sensor (including a case where the user currently grips the portable terminal), thereby preventing malfunction of a portable terminal.

In the input detection device according to the related art described above, a contact is detected and the detected contact is uniformly validated in a case where a pressing force is equal to or more than a threshold value. Therefore, in a case where a pressing force that is equal to or more than the threshold value is already applied to a pressing detectable area due to any reason before the user performs a pressing operation, once a contact based on the pressing operation is detected, the detected contact is validated immediately and processing corresponding to the pressing operation is executed. In this case, since the contact is instantaneously validated with a light touch, the user who recognizes that the contact is validated only when the pressing operation is performed by pushing may receive an impression that processing related to validity/invalidity of the contact is performed in a manner different from the usual, and may misrecognize that an error has occurred.

SUMMARY

The present disclosure has been made in an effort to solve the above-described problems, and an object of the present disclosure is to inhibit a contact from being validated in a manner greatly different from the usual even in a case where a user performs a pressing operation in a state in which application of a pressing force to a pressing detectable area is detected.

In order to solve the above-described problems, in the present disclosure, application of a pressing force is detected after a contact is detected, and then in a case where the pressing force is equal to or more than a determination reference value, the contact is validated. Meanwhile, a transition to a special mode is performed in a case where application of a pressing force is detected before a contact is detected, and in a case where a contact is detected after the transition to the special mode, whether or not a predetermined condition set in the special mode is satisfied is monitored, and the detected contact is validated when the predetermined condition is satisfied.

According to the embodiment configured as described above, in a usual case where a contact is detected before a pressing force is detected, since the detected contact is validated only when a pressing force that is equal to or more than the determination reference value is detected after the contact is made, it is possible to determine that the contact is valid when the user performs a pressing operation. Meanwhile, in a case where a contact is detected in a state in which a pressing force is detected, the contact is not validated immediately upon the detection of the contact, but the contact is validated only when a predetermined condition set in the special mode is satisfied. Therefore, in this case, a contact is not instantaneously validated with a light touch, and it is necessary to perform an intentional operation, in which the contact is continuously made until the predetermined condition is satisfied in order to make the contact valid, the intentional operation being equivalent to the pressing operation. Accordingly, in this case, it is possible to inhibit a contact from being validated in a manner greatly different from the usual.

DETAILED DESCRIPTION OF THE PREFERRED EMBODIMENTS

Figure 1A:
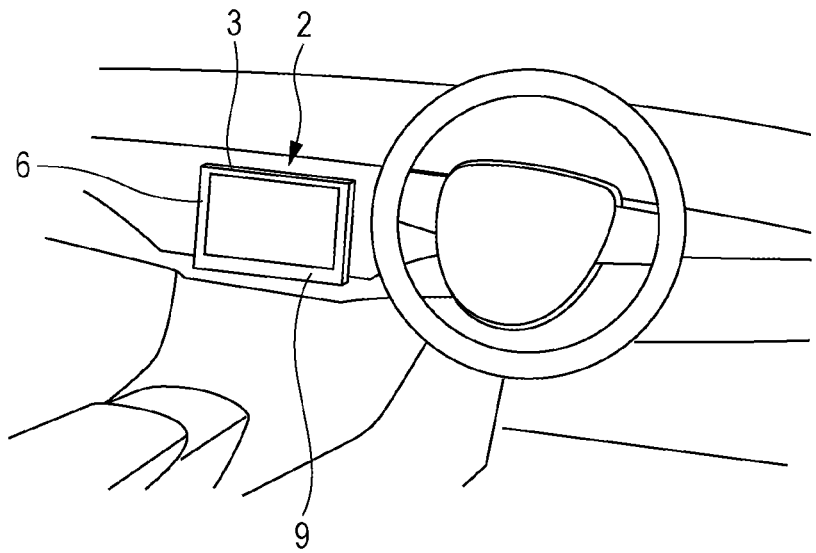
FIGS. 1A and 1B are a view illustrating a state in which an in-vehicle device to which an input detection device according to a first embodiment of the present invention is applied is provided in a passenger compartment of a vehicle, and a front view of a display input device, respectively.
Figure 1B:
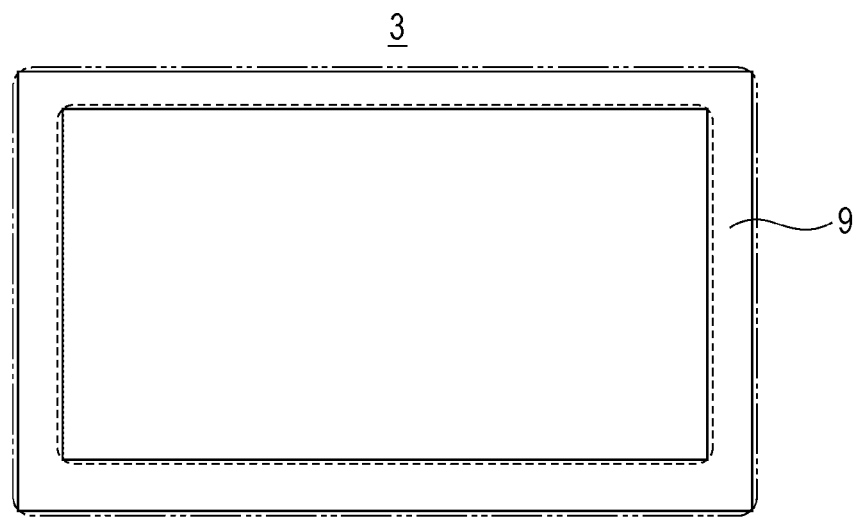
Figure 2:
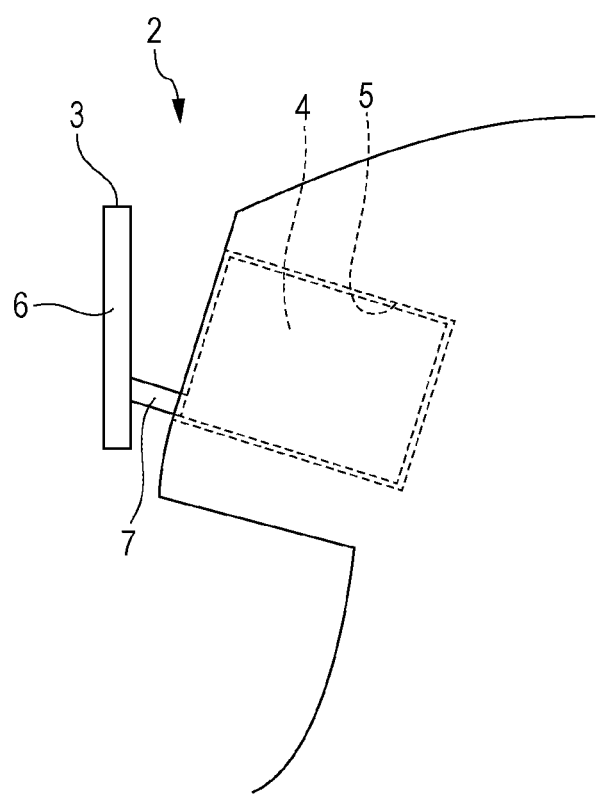
FIG. 2 is a view illustrating a place where the in-vehicle device is provided in the vehicle, when viewed from the side.

Hereinafter, an embodiment of the present invention will be described with reference to the drawings. FIG. 1A is a view illustrating a state in which an in-vehicle device 2 to which an input detection device 1 (FIG. 4) according to the present embodiment is applied is provided in a passenger compartment of a vehicle. FIG. 1B is a front view of a display input device 3 included in the in-vehicle device 2. FIG. 2 is a view illustrating a place where the in-vehicle device 2 is provided in the compartment of the vehicle, when viewed from the side.

As illustrated in FIG. 2, the in-vehicle device 2 according to the present embodiment includes the display input device 3, and an arithmetic processing device 4 including the input detection device 1 according to the present embodiment. A casing of the arithmetic processing device 4 is housed in a housing space 5 provided at a predetermined position in a dashboard. The display input device 3 includes a plate-shaped casing 6, and is supported by the arithmetic processing device 4 through a support member 7 outside the housing space 5.

The display input device 3 is a device having a function of displaying an image, and a function of receiving an input from a user through a touch operation. As described above, the display input device 3 is not housed in the housing space 5, but is disposed outside the housing space 5. Therefore, a side surface of the casing 6 of the display input device 3 is exposed, and the user can grip the side of the casing 6.

As illustrated in FIG. 1B, a contact detectable area 8, which is the largest area in which a touch operation of the user can be detected, is formed in a front surface of the display input device 3. In addition, in the front surface of the display input device 3, a pressing detectable area 11 is formed in an area constituted by the contact detectable area 8 and a frame portion front surface area 10, the frame portion front surface area 10 being an area corresponding to a front surface of a frame-shaped frame portion 9, and surrounding the contact detectable area 8. The pressing detectable area 11 is equivalent to an entire area of the front surface of the display input device 3. The contact detectable area 8 and the pressing detectable area 11 will be described in detail later.

Figure 3:
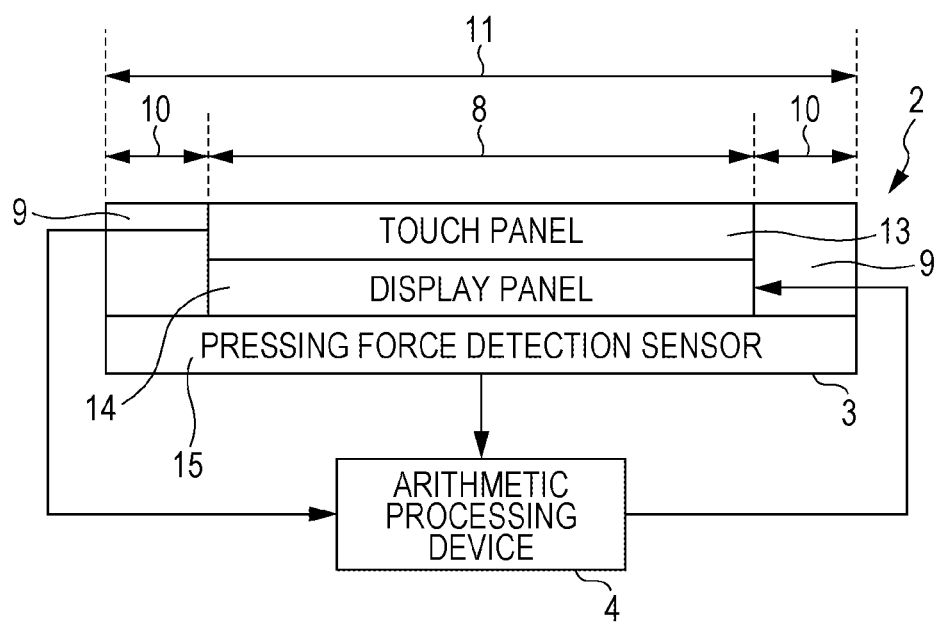
FIG. 3 is a diagram illustrating an example of a configuration of the in-vehicle device to which the input detection device according to the first embodiment of the present invention is applied.

FIG. 3 is a diagram schematically illustrating an example of a configuration of the in-vehicle device 2. As illustrated in FIG. 3, the in-vehicle device 2 includes the arithmetic processing device 4 and the display input device 3, and the display input device 3 includes a touch panel 13, a display panel 14, and a pressing force detection sensor 15. FIG. 3 is a diagram for clarifying a relationship between the touch panel 13, the display panel 14, and the pressing force detection sensor 15, and for clarifying a relationship between these members, the contact detectable area 8, and the pressing detectable area 11, and schematically illustrates the respective members of the display input device 3. The upper side of FIG. 3 is a front surface side of the display input device 3.

As illustrated in FIG. 3, in the front surface of the display input device 3, the contact detectable area 8 in which a contact can be detected by the touch panel 13 is formed in an area that is equivalent to an entire area of a front surface of the touch panel 13. The touch panel 13 detects a contact on the contact detectable area 8 and outputs contact position information indicating a contact position of the contact. The touch panel 13 continuously outputs the contact position information during contact detection.

The display panel 14 is provided on a back side of the touch panel 13. The display panel 14 displays an image generated by the arithmetic processing device 4 and is implemented by, for example, a liquid crystal panel or an organic electroluminescence (EL) panel.

The frame portion 9 is provided to surround the touch panel 13 and the display panel 14, and the touch panel 13 and the display panel 14 are supported by the frame portion 9.

In the display input device 3, the pressing force detection sensor 15 is provided on a back side of the display panel 14. As illustrated in FIG. 3, an area that is equivalent to an entire area of a front surface of the pressing force detection sensor 15 includes the contact detectable area 8 (the entire area of the front surface of the touch panel 13) and the frame portion front surface area 10 corresponding to the area of the front surface of the frame portion 9 that surrounds the contact detectable area 8. That is, the entire area of the front surface of the pressing force detection sensor 15 is equivalent to the entire area of the front surface of the display input device 3. In the front surface of the display input device 3, the pressing detectable area 11 is formed in an area that is equivalent to the entire area of the front surface of the pressing force detection sensor 15, that is, the entire area of the front surface of the display input device 3. The pressing force detection sensor 15 detects application of a pressing force to the pressing detectable area 11, and outputs pressing force information indicating a pressing force. The pressing force detection sensor 15 continuously outputs the pressing force information during the application of the pressing force to the pressing detectable area 11. As such, the pressing detectable area 11 is the largest area in which pressing can be detected by the pressing force detection sensor 15.

As described above, in the present embodiment, the pressing detectable area 11 includes the contact detectable area 8, and is larger than the contact detectable area 8 by the amount of the frame portion front surface area 10. Further, the pressing force detection sensor 15 detects application of a pressing force to the pressing detectable area 11. Therefore, the pressing force information is output from the pressing force detection sensor 15 even in a case where the pressing force is applied to the frame portion front surface area 10, similarly to a case where a pressing force is applied to the contact detectable area 8. For this reason, it is not possible to distinguish, based on the pressing force information output from the pressing force detection sensor 15, whether pressing of the display input device 3 is applied at the contact detectable area 8 or the frame portion front surface area 10.

The contact position information output from the touch panel 13 and the pressing force information output from the pressing force detection sensor 15 are supplied to the arithmetic processing device 4.

Figure 4:
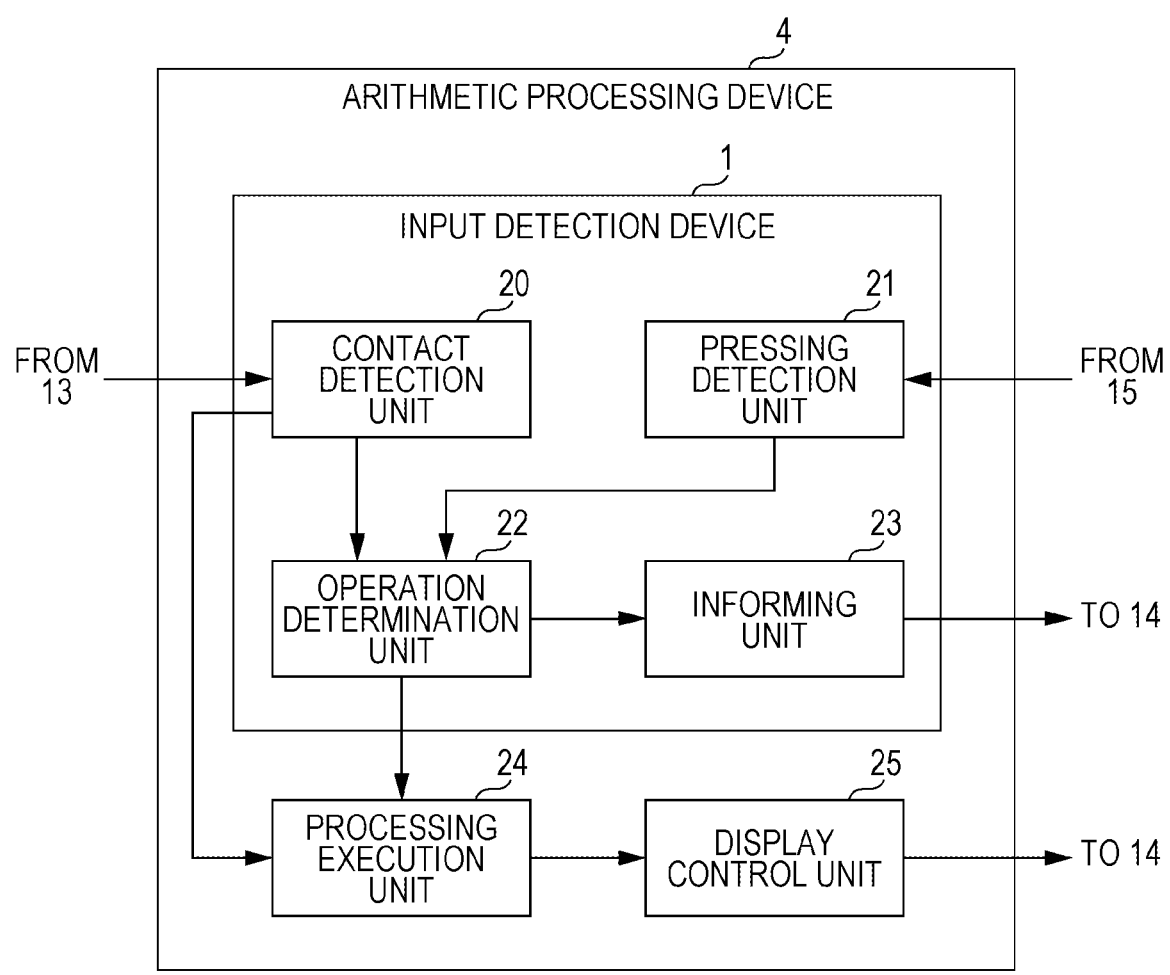
FIG. 4 is a block diagram illustrating an example of functional components of an arithmetic processing device to which the input detection device according to the first embodiment of the present invention is applied.

FIG. 4 is a block diagram illustrating an example of functional components of the arithmetic processing device 4 including the input detection device 1 according to the present embodiment. As illustrated in FIG. 4, the arithmetic processing device 4 according to the present embodiment includes, as functional components, a contact detection unit 20, a pressing detection unit 21, an operation determination unit 22, an informing unit 23, a processing execution unit 24, and a display control unit 25. Among these functional components, the contact detection unit 20, the pressing detection unit 21, the operation determination unit 22, and the informing unit 23 are included in the input detection device 1 according to the present embodiment.

Each of the functional blocks 20 to 25 described above can be implemented by any one of hardware, a digital signal processor (DSP), or software. For example, in a case of being implemented by software, each of the functional blocks 20 to 25 includes a central processing unit (CPU), a random access memory (RAM), a read only memory (ROM), and the like of a computer in an actual implementation, and is implemented by executing a program stored in a recording medium such as a RAM, a ROM, a hard disk, or a semiconductor memory.

The contact detection unit 20 detects a contact on the contact detectable area 8 and a contact position of the contact based on contact position information supplied from the touch panel 13. Hereinafter, a state in which a contact on the contact detectable area 8 is detected by the contact detection unit 20 will be referred to as a "contact-detected state", whereas a state in which no contact on the contact detectable area 8 is detected by the contact detection unit 20 will be referred to as a "no-detected-contact state". The contact detection unit 20 outputs detected contact position information indicating the detected contact position to the processing execution unit 24. Further, at the time of a transition to the contact-detected state and at the time of a transition to the no-detected-contact state, the contact detection unit 20 notifies the operation determination unit 22 of the state transition.

The pressing detection unit 21 detects application of a pressing force to the pressing detectable area 11, and the pressing force based on pressing force information supplied from the pressing force detection sensor 15. Hereinafter, a state in which application of a pressing force to the pressing detectable area 11 is detected by the pressing detection unit 21 will be referred to as a "pressing-detected state", and a state in which no application of a pressing force to the pressing detectable area 11 is detected by the pressing detection unit 21 will be referred to as a "no-detected-pressing state". The pressing detection unit 21 outputs detected pressing force information indicating the detected pressing force to the operation determination unit 22. Further, at the time of a transition to the pressing-detected state and at the time of a transition to the no-detected-pressing state, the pressing detection unit 21 notifies the operation determination unit 22 of the state transition.

In a case where application of a pressing force is detected by the pressing detection unit 21 after a contact is detected by the contact detection unit 20, and the pressing force is equal to or more than a determination reference value, the operation determination unit 22 validates the contact detected by the contact detection unit 20. Meanwhile, the operation determination unit 22 performs a transition to a special mode in a case where application of a pressing force is detected by the pressing detection unit 21 before a contact is detected by the contact detection unit 20, and in a case where a contact is detected by the contact detection unit 20 after the transition to the special mode, validates the contact when a predetermined condition set in the special mode is satisfied. Particularly, in a case where a contact is detected by the contact detection unit 20 after the transition to the special mode, when a duration of the contact is equal to or more than a predetermined time, the operation determination unit 22 according to the present embodiment validates the contact regardless of a pressing force of the contact at that time. Hereinafter, processing performed by the operation determination unit 22 will be described in detail.

Here, in the present embodiment, the user recognizes that a pressing operation needs to be performed when selecting an object displayed in the GUI of the display panel 14, such as an icon or a block, through a touch operation. The pressing operation refers to an operation of touching a desired position in the contact detectable area 8 and then pressing the desired position by pushing the desired position, rather than only lightly touching the desired position. As apparent from the following description, in a case where the pressing operation is performed in a state in which no pressing force is applied to the pressing detectable area 11, and a contact is detected by the contact detection unit 20 due to the pressing operation, the contact is valid when a pressing force detected by the pressing detection unit 21 is equal to or more than a determination reference value L1.

In the following description of the processing performed by the operation determination unit 22, the operation determination unit 22 frequently recognizes a transition between the contact-detected state and the no-detected-contact state, and a transition between the pressing-detected state and the no-detected-pressing state based on notification from the contact detection unit 20 and notification from the pressing detection unit 21. Further, the operation determination unit 22 frequently recognizes a pressing force detected by the pressing detection unit 21 based on detected pressing force information input from the pressing detection unit 21. Hereinafter, a pressing force (a pressing force actually and currently applied to the pressing detectable area 11) recognized by the operation determination unit 22 based on the detected pressing force information will be referred to as a "detected pressing force".

It is assumed that current states are the no-detected-contact state and no-detected-pressing state. In this state, the operation determination unit 22 monitors whether or not a transition to the contact-detected state occurs and monitors whether or not a transition to the pressing-detected state occurs. Hereinafter, such processing will be referred to as "initial monitoring processing". In a case where the transition to the contact-detected state occurs before the transition to the pressing-detected state, there is a possibility that the user performed a pressing operation on the contact detectable area 8 in a situation in which no pressing force is currently applied to the pressing detectable area 11. Therefore, in this case, the operation determination unit 22 further monitors whether or not a transition to the no-detected-contact state occurs and monitors whether or not a detected pressing force is equal to or more than the determination reference value L1.

In a case where the detected pressing force is equal to or more than the determination reference value L1 and the transition to the no-detected-contact state does not occur, the operation determination unit 22 determines that the contact detected by the contact detection unit 20 is based on the pressing operation, and validates the contact. Hereinafter, a contact detected by the contact detection unit 20 will be referred to as a "detected contact". In a case where the detected contact is validated, the operation determination unit 22 outputs, to the processing execution unit 24, validation notification information for notifying that the detected contact has been validated.

Figure 5:
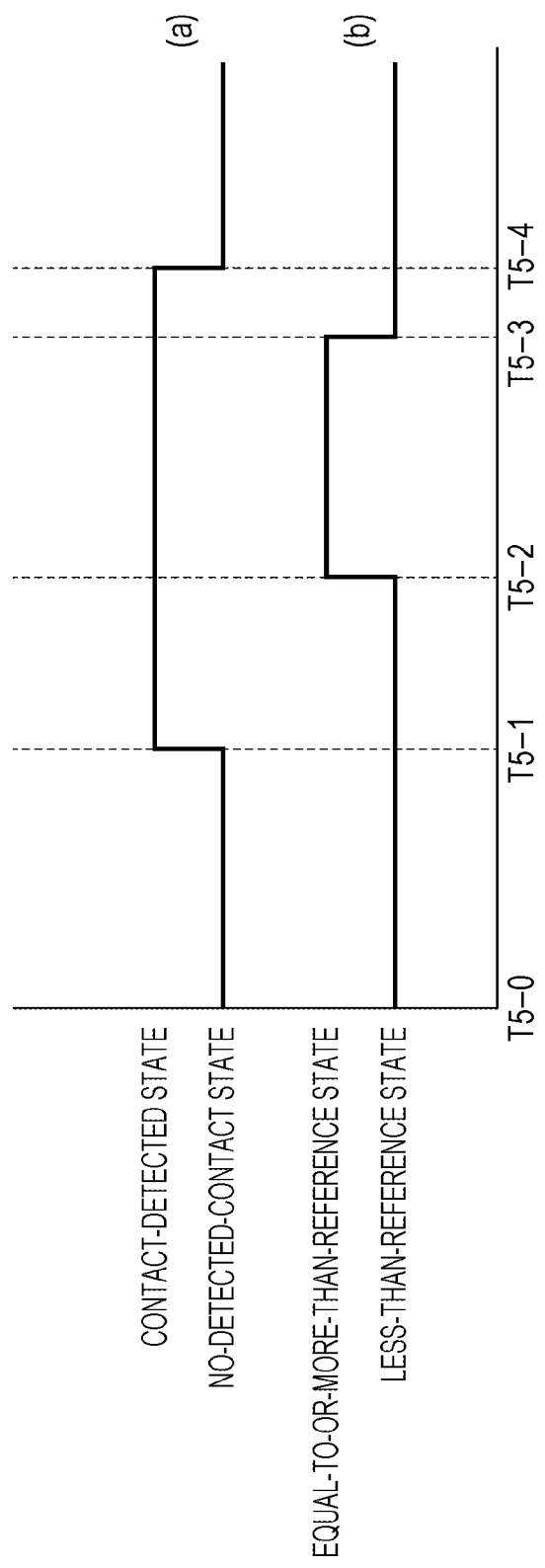
FIG. 5 is a timing chart illustrating a change between states until a detected contact is validated.

FIG. 5 is a timing chart illustrating a change ((a) in FIG. 5) between the contact-detected state and the no-detected-contact state over time until the operation determination unit 22 validates the detected contact in a case where the transition to the contact-detected state occurs before the transition to the pressing-detected state, and illustrating a change ((b) in FIG. 5) between a state in which the detected pressing force is less than the determination reference value L1 (hereinafter, referred to as a "less-than-reference state"), and a state in which the detected pressing force is equal to or more than the determination reference value L1 (hereinafter, referred to as an "equal-to-or-more-than-reference state") over time.

In FIG. 5, at a timing T5-0, current states are the no-detected-contact state and the less-than-reference state. Next, a transition to the contact-detected state occurs at a timing T5-1, and then a transition to the equal-to-or-more-than-reference state occurs at a timing T5-2. In this case, the operation determination unit 22 determines that the detected contact is based on the pressing operation and validates the detected contact at the timing T5-2. Note that the current state is the less-than-reference state at a timing T5-3, and is the no-detected-contact state at a timing T5-4.

Meanwhile, in a case where a transition to the no-detected-contact state occurs before the detected pressing force becomes equal to or more than the determination reference value L1, it may be considered that the user performed a light touch operation on the contact detectable area 8, or an object accidentally came into contact with the contact detectable area 8. In this case, the operation determination unit 22 starts execution of the initial monitoring processing again after the current states become the no-detected-contact state and the no-detected-pressing state.

As such, in a case where application of a pressing force is detected by the pressing detection unit 21 after a contact is detected by the contact detection unit 20, and the pressing force is equal to or more than the determination reference value L1, the operation determination unit 22 validates the detected contact. As a result, it is possible to prevent the detected contact from being validated in a case where a light touch operation is performed or an accidental unintended light touch is applied on the contact detectable area 8 as much as possible, and ideally it is possible to validate, only when the user performs a pressing operation, a detected contact based on the pressing operation.

Meanwhile, a state in which a transition to the pressing-detected state occurs before a transition to the contact-detected state means that a pressing force is applied to the frame portion front surface area 10, rather than the contact detectable area 8. This is because in a case where the pressing force is applied to the contact detectable area 8, a transition to the contact-detected state occurs first. In the present embodiment, a representative case in which a pressing force is applied to the frame portion front surface area 10 is described below.

That is, as described with reference to FIGS. 1A to 2, in the display input device 3 according to the present embodiment, the side surface of the casing 6 is exposed, and thus the user can grip the side of the casing 6. Further, at the time of performing a pressing operation on the contact detectable area 8, the user may grip the side of the casing 6 with a palm of one hand to stably perform the pressing operation, and may try to perform the pressing operation with a thumb of the one hand while positioning the one hand with respect to the casing 6. At this time, the frame portion front surface area 10 may be pushed toward the inner side of the hand with which the casing 6 is gripped, and as a result, a pressing force may be applied to the frame portion front surface area 10. However, a case in which a pressing force is applied to the frame portion front surface area 10 is not limited thereto. For example, in a case where the user grips the casing 6 of the display input device 3 with one hand, and tries to perform a pressing operation with a finger of the other hand, a pressing force may be applied to the frame portion front surface area 10.

In a case where a transition to the pressing-detected state occurs before a transition to the contact-detected state, the operation determination unit 22 further monitors whether or not a transition to the no-detected-pressing state occurs and monitors whether or not the detected pressing force is equal to or more than a pressing force threshold value OT1. Note that the pressing force threshold value OT1 is smaller than the determination reference value L1. The monitoring of whether or not the detected pressing force is equal to or more than the pressing force threshold value OT1 is processing performed to prevent an operation mode from transitioning to the special mode (to be described later) in a case where instantaneous pressing is applied to the frame portion front surface area 10 (for example, pressing caused by vibration of the vehicle). Based on this, the pressing force threshold value OT1 is set to a value with which it can be predicted that pressing applied to the frame portion front surface area 10 is to be continued in a case where the detected pressing force is equal to or more than the pressing force threshold value OT1. Note that monitoring of whether or not a time elapsed from a transition to the pressing-detected state is equal to or more than a predetermined time threshold value may be performed, instead of determining whether or not the detected pressing force is equal to or more than the pressing force threshold value OT1. This is because it is possible to predict, when the pressing-detected state continues for a certain time, that the pressing applied to the frame portion front surface area 10 is to be continued.

Note that a configuration in which the determination of whether or not the detected pressing force is equal to or more than the pressing force threshold value OT1 is not performed may also be possible. With this configuration, a transition to the special mode (to be described later) is performed in a case where a transition to the pressing-detected state occurs.

A state in which the detected pressing force is not equal to or more than the pressing force threshold value OT1, and a transition to the no-detected-pressing state occurs means that the pressing force is applied to the frame portion front surface area 10 for any reason, but the pressing applied to the frame portion front surface area 10 is immediately released. In this case, the operation determination unit 22 starts execution of the initial monitoring processing again after the current states become the no-detected-contact state and the no-detected-pressing state.

Meanwhile, in a case where the detected pressing force is equal to or more than the pressing force threshold value OT1, the operation determination unit 22 performs a transition of the operation mode to the special mode. After the transition of the operation mode to the special mode is performed, the operation determination unit 22 notifies the informing unit 23 that the transition to the special mode has been performed. In addition, the operation determination unit 22 monitors whether or not a transition to the no-detected-pressing state occurs and monitors whether or not a transition to the contact-detected state occurs. A state in which a transition to the no-detected-pressing state occurs before a transition to the contact-detected state means that the pressing applied to the frame portion front surface area 10 is released before the contact on the contact detectable area 8 is made. In this case, the operation determination unit 22 stops the transition to the special mode, and notifies the informing unit 23 that the transition to the special mode has been stopped. In addition, the operation determination unit 22 starts execution of the initial monitoring processing again after the current states become the no-detected-contact state and the no-detected-pressing state.

Meanwhile, in a case where a transition to the no-detected-pressing state does not occur and a transition to the contact-detected state occurs, it is assumed that the user has started to perform a pressing operation on the contact detectable area 8. Particularly, in the present embodiment, there is a possibility that the user started to perform the pressing operation with a thumb of one hand while gripping the casing 6 of the display input device 3 with the one hand. In this case, the operation determination unit 22 executes the following processing.

That is, the operation determination unit 22 monitors whether or not a transition to the no-detected-pressing state occurs, monitors whether or not a transition to the no-detected-contact state occurs while the pressing-detected state is maintained, and further monitors whether or not a duration of the contact-detected state reaches a time threshold value TT1. In the present embodiment, a condition that "the duration of the contact-detected state reaches the time threshold value TT1" corresponds to "a predetermined condition set in the special mode."

A state in which a transition to the no-detected-pressing state occurs before the duration of the contact-detected state reaches the time threshold value TT1 means that no pressing force is applied to the pressing detectable area 11. In this case, since it is considered that a transition to the no-detected-contact state occurs at the same time, the operation determination unit 22 stops the transition to the special mode, and notifies the informing unit 23 that the transition to the special mode has been stopped. In addition, the operation determination unit 22 starts execution of the initial monitoring processing again.

Meanwhile, a state in which a transition to the no-detected-contact state occurs while the pressing-detected state is maintained, before the duration of the contact-detected state reaches the time threshold value TT1, means that the pressing applied to the frame portion front surface area 10 continues and the contact on the contact detectable area 8 is released. In this case, there is a possibility that the user stopped the pressing operation in a state of gripping the casing 6 of the display input device 3. Therefore, in this case, the operation determination unit 22 clears a measured time elapsed. Further, the operation determination unit 22 monitors whether or not a transition to the no-detected-pressing state occurs while monitoring whether or not a transition to the contact-detected state occurs again while the pressing-detected state is maintained. In a case where the transition to the contact-detected state occurs again while the pressing-detected state is maintained, there is a possibility that the user started to perform the pressing operation again. Therefore, in this case, the operation determination unit 22, again, monitors whether or not a transition to the no-detected-pressing state occurs, monitors whether or not a transition to the no-detected-contact state occurs while the pressing-detected state is maintained, and further monitors whether or not the duration of the contact-detected state reaches the time threshold value TT1. Meanwhile, in a case where a transition to the no-detected-pressing state occurs, the operation determination unit 22 stops the transition to the special mode, and notifies the informing unit 23 that the transition to the special mode has been stopped. In addition, the operation determination unit 22 starts execution of the initial monitoring processing again.

In a case where a transition to the no-detected-contact state does not occur while the pressing-detected state is maintained without transitioning to the no-detected-pressing state, and the duration of the contact-detected state reaches the time threshold value TT1, the operation determination unit 22 validates the detected contact and outputs, to the processing execution unit 24, validation notification information for notifying that the detected contact has been validated. Note that, in the present embodiment, the operation determination unit 22 validates the detected contact regardless of a value of the detected pressing force at a point in time at which the duration of the contact-detected state reaches the time threshold value TT1. In addition, the operation determination unit 22 stops the transition to the special mode, and notifies the informing unit 23 that the transition to the special mode has been stopped.

As described above, in the present embodiment, in a case where application of a pressing force is detected by the pressing detection unit 21 before a contact is detected by the contact detection unit 20, a transition to the special mode is performed, and in a case where a contact is detected by the contact detection unit 20 after the transition to the special mode, whether or not a duration of the contact reaches the time threshold value TT1 is monitored, and the contact is validated when the duration of the contact is equal to or more than the time threshold value TT1, regardless of the pressing force of the contact at that time. As the processing as described above is executed, the following effects are exhibited.

That is, in a case where a transition to the contact-detected state occurs in a situation in which a transition to the special mode is performed, there is a possibility that the detected pressing force is equal to or more than the determination reference value L1 at a point in time at which the transition to the contact-detected state occurs. In a configuration of uniformly validating, in a case where a contact is detected by the contact detection unit 20 and a detected pressing force is equal to or more than the determination reference value L1, the detected contact, the detected contact is validated immediately when the detected pressing force is equal to or more than the determination reference value L1 at a point in time at which a transition to the contact-detected state occurs, and processing corresponding to the detected contact is executed. In this case, since the detected contact is instantaneously validated with a light touch, the user who recognizes that the detected contact is validated only when the pressing operation of pressing the contact detectable area 8, by pushing the contact detectable area 8, is performed may receive an impression that determination of validity/invalidity of the detected contact is performed in a manner different from the usual, and may misrecognize that an error has occurred.

Meanwhile, according to the present embodiment, in a case where a contact is detected by the contact detection unit 20 after a transition to the special mode, the detected contact is not validated immediately upon the detection of the contact, but the detected contact is validated only when the contact is continuously made for a time that is equal to or more than the time threshold value TT1. Therefore, the detected contact is not instantaneously validated with a light touch, and it is necessary to perform an intentional operation, in which the contact is continuously made until a time that is equal to or more than the time threshold value TT1 elapses in order to make the contact valid, the intentional operation being equivalent to the pressing operation. Therefore, according to the present embodiment, even in a case where application of a pressing force is detected by the pressing detection unit 21 before a contact is detected by the contact detection unit 20, it is possible to inhibit the contact from being validated in a manner greatly different from the usual.

Note that, in the present embodiment, the operation determination unit 22 validates the detected contact regardless of a value of the detected pressing force at a point in time at which the duration of the contact-detected state reaches the time threshold value TT1. The reason thereof is as follows. That is, in the present embodiment, in a case where a contact is made on the contact detectable area 8 for a time that is equal to or more than the time threshold value TT1 in a state in which a pressing force is applied to the frame portion front surface area 10, it is assumed that the user performed a pressing operation while gripping the casing 6 of the display input device 3. Therefore, it is considered that the user performed the pressing operation in a case where a duration of the contact-detected state reaches the time threshold value TT1, and the detected contact is validated regardless of a value of a detected pressing force of the contact.

The informing unit 23 informs the user that a transition to the special mode has been made in a period from a time when the notification that the transition of the operation mode to the special mode has been performed is received from the operation determination unit 22 to a time when the notification that the transition to the special mode has been stopped is received. In the present embodiment, the informing unit 23 informs the user that the transition to the special mode is made by changing an appearance of an object of the GUI displayed on the display panel 14, such as a shape or color, according to a predetermined rule. The user can recognize that the transition to the special mode is made by recognizing the change of the appearance of the object of the GUI, such as a shape or color. Note that an informing method of the informing unit 23 is not limited to the method described in the present embodiment. For example, the informing unit 23 may display information indicating that the transition to the special mode is made in a form of a pop-up notification on the GUI of the display panel 14, or may inform the user by using a sound.

When the operation determination unit 22 inputs the validation notification information, the processing execution unit 24 recognizes that the detected contact is valid, and recognizes a contact position based on the detected contact position information input from the contact detection unit 20 at a point in time at which the validation notification information is input. Next, the processing execution unit 24 executes predetermined processing corresponding to an object displayed at the contact position in the GUI of the display panel 14.

The display control unit 25 performs a control to display an image generated by the processing execution unit 24 on the display panel 14 based on an execution result of the predetermined processing performed by the processing execution unit 24. As a result, the image displayed on the display panel 14 is switched according to a pressing operation of the user performed on the pressing detectable area 11.

Next, an example of an operation of the arithmetic processing device 4 including the input detection device 1 according to the present embodiment will be described with reference to a flowchart FA in FIGS. 6 and 7. The flowchart FA is a flowchart illustrating an example of an operation of the operation determination unit 22 after the initial monitoring processing starts. At a starting point of the flowchart FA, current states are the no-detected-contact state and the no-detected-pressing state.

Figure 6:
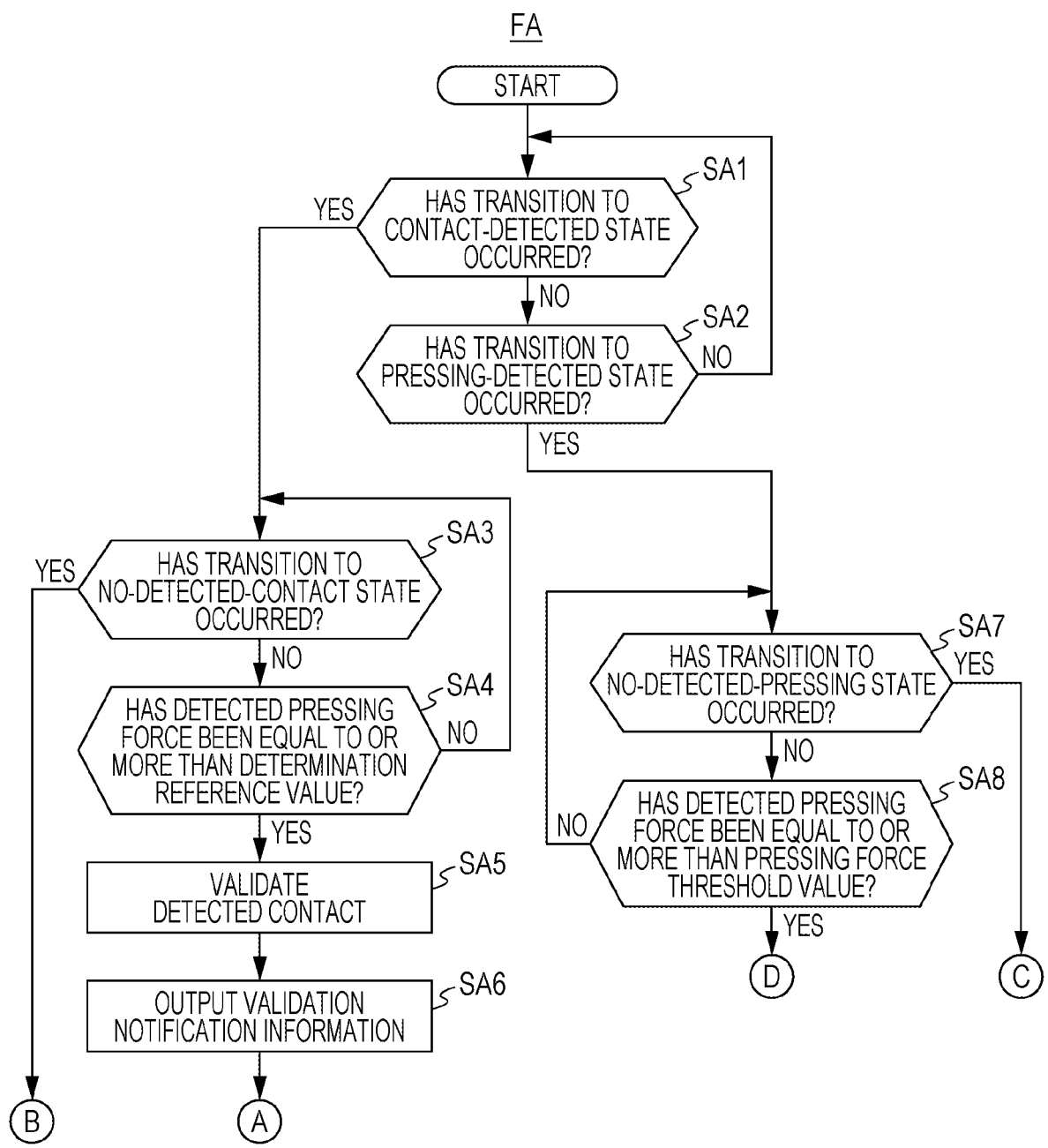
FIG. 6 is a flowchart illustrating an example of an operation of the arithmetic processing device to which the input detection device according to the first embodiment of the present invention is applied.

As illustrated in FIG. 6, the operation determination unit 22 monitors whether or not a transition to the contact-detected state occurs (Step SA1), and monitors whether or not a transition to the pressing-detected state occurs (Step SA2). In a case where the transition to the contact-detected state occurs before the transition to the pressing-detected state (Step SA1: YES), the operation determination unit 22 further monitors whether or not a transition to the no-detected-contact state occurs (Step SA3), and monitors whether or not a detected pressing force is equal to or more than the determination reference value L1 (Step SA4).

In a case where the detected pressing force is equal to or more than the determination reference value L1 and the transition to the no-detected-contact state does not occur (Step SA4: YES), the operation determination unit 22 determines that the contact detected by the contact detection unit 20 is based on the pressing operation, and validates the contact (Step SA5). Next, the operation determination unit 22 outputs, to the processing execution unit 24, validation notification information for notifying that the detected contact has been validated (Step SA6). After the processing in Step SA6, the flowchart FA ends. Meanwhile, in a case where the transition to the no-detected-contact state occurs before the detected pressing force becomes equal to or more than the determination reference value L1 (Step SA3: YES), the flowchart FA ends.

Meanwhile, in a case where the transition to the pressing-detected state occurs before the transition to the contact-detected state (Step SA2: YES), the operation determination unit 22 further monitors whether or not a transition to the no-detected-pressing state occurs (Step SA7), and monitors whether or not the detected pressing force is equal to or more than the pressing force threshold value OT1 (Step SA8). In a case where the transition to the no-detected-pressing state occurs before the detected pressing force becomes equal to or more than the pressing force threshold value OT1 (Step SA7: YES), the flowchart FA ends.

Figure 7:
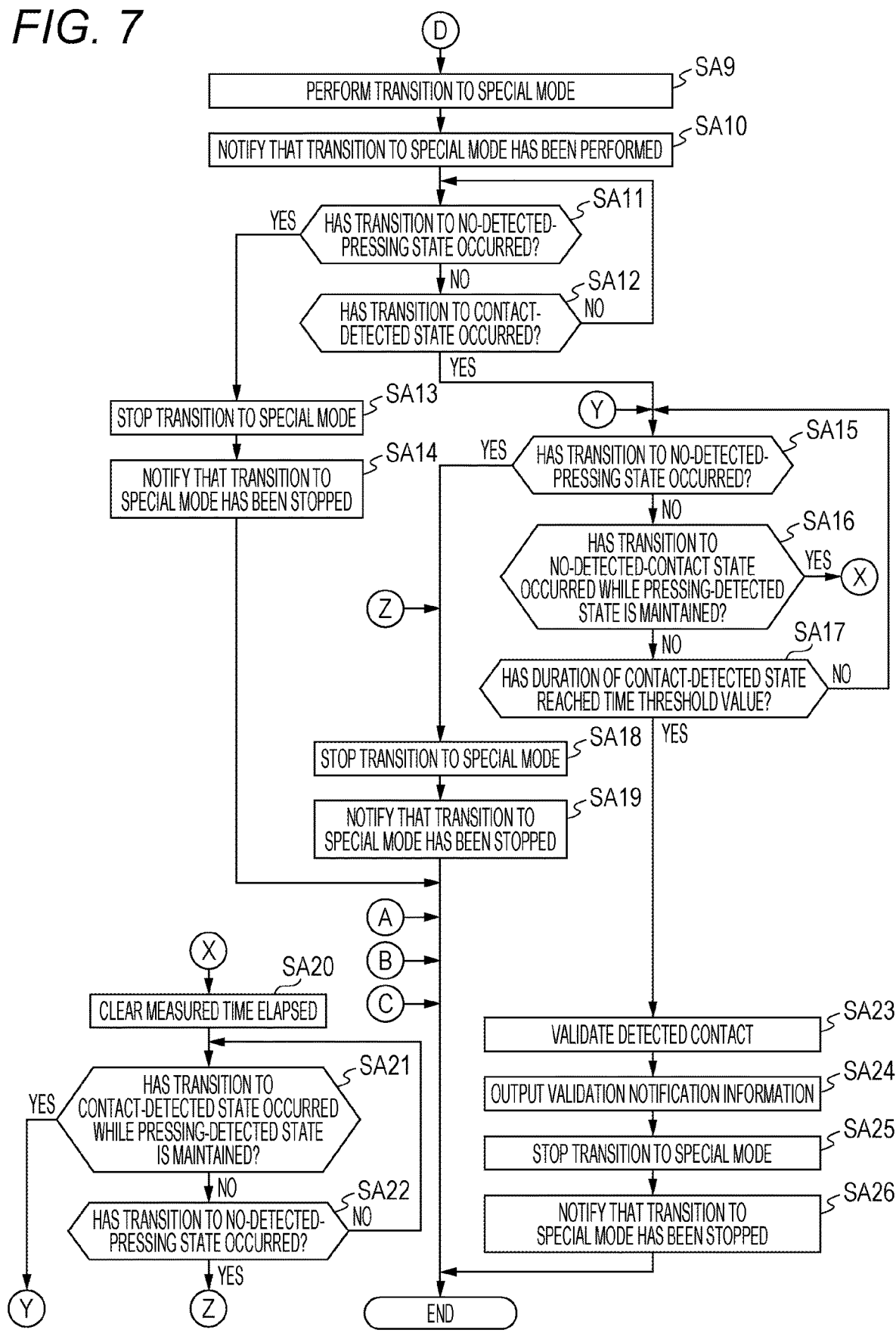
FIG. 7 is a flowchart illustrating the example of the operation of the arithmetic processing device to which the input detection device according to the first embodiment of the present invention is applied.

As illustrated in FIG. 7, in a case where the transition to the no-detected-pressing state does not occur, and the detected pressing force is equal to or more than the pressing force threshold value OT1 (Step SA8: YES), the operation determination unit 22 performs a transition of the operation mode to the special mode (Step SA9). Next, the operation determination unit 22 notifies the informing unit 23 that the transition to the special mode has been performed (Step SA10).

In addition, the operation determination unit 22 monitors whether or not the transition to the no-detected-pressing state occurs (Step SA11), and monitors whether or not the transition to the contact-detected state occurs (Step SA12). In a case where the transition to the contact-detected state does not occur and the transition to the no-detected-pressing state occurs (Step SA11: YES), the operation determination unit 22 stops the transition to the special mode (Step SA13), and notifies the informing unit 23 that the transition to the special mode has been stopped (Step SA14). After the processing in Step SA14, the flowchart FA ends.

Meanwhile, in a case where the transition to the no-detected-pressing state does not occur and the transition to the contact-detected state occurs (Step SA12: YES), the operation determination unit 22 monitors whether or not the transition to the no-detected-pressing state occurs (Step SA15), monitors whether or not the transition to the no-detected-contact state occurs while the pressing-detected state is maintained (Step SA16), and further monitors whether or not a duration of the contact-detected state reaches the time threshold value TT1 (Step SA17). In a case where the transition to the no-detected-pressing state occurs before the duration of the contact-detected state reaches the time threshold value TT1 (Step SA15: YES), the operation determination unit 22 stops the transition to the special mode (Step SA18), and notifies the informing unit 23 that the transition to the special mode has been stopped (Step SA19). After the processing in Step SA19, the flowchart FA ends.

Meanwhile, in a case where the transition to the no-detected-contact state occurs while the pressing-detected state is maintained before the duration of the contact-detected state reaches the time threshold value TT1 (Step SA16: YES), the operation determination unit 22 clears a measured time elapsed (Step SA20). Next, the operation determination unit 22 monitors whether or not the transition to the contact-detected state occurs while the pressing-detected state is maintained (Step SA21), and monitors whether or not the transition to the no-detected-pressing state occurs (Step SA22). In a case where the transition to the contact-detected state occurs again while the pressing-detected state is maintained (Step SA21: YES), the processing procedure returns to Step SA15. Meanwhile, in a case where the transition to the no-detected-pressing state occurs (Step SA22: YES), the processing procedure proceeds to Step SA18.

Meanwhile, in a case where the transition to the no-detected-contact state does not occur while the pressing-detected state is maintained without transitioning to the no-detected-pressing state, the transition to the no-detected-pressing state or to the no-detected-contact state does not occur, and the duration of the contact-detected state reaches the time threshold value TT1 (Step SA17: YES), the operation determination unit 22 validates the detected contact (Step SA23), and outputs, to the processing execution unit 24, validation notification information for notifying that the detected contact has been validated (Step SA24). Next, the operation determination unit 22 stops the transition to the special mode (Step SA25), and notifies the informing unit 23 that the transition to the special mode has been stopped (Step SA26). After the processing in Step SA26, the flowchart FA ends.

Modified Example of First Embodiment

Next, a modified example of the first embodiment will be described. In the above-described first embodiment, in a case where the duration of the contact-detected state reaches the time threshold value TT1 after the transition to the special mode, the operation determination unit 22 validates the detected contact regardless of a value of the detected pressing force at a point in time at which the duration of the contact-detected state reaches the time threshold value TT1. In this regard, the operation determination unit 22 may validate the detected contact in a case where the duration of the contact-detected state reaches the time threshold value TT1 and a detected pressing force of the contact is equal to or more than a predetermined value, or in a case where the detected pressing force becomes equal to or more than the predetermined value thereafter. The predetermined value is equivalent to the determination reference value L1.

Here, in a case where the detected pressing force is less than the predetermined value at a point in time at which the duration of the contact-detected state reaches the time threshold value TT1, the detected contact is assumed as not being based on a pressing operation of the user. Therefore, according to the modified example, it is possible that validation of the detected contact based on an event other than the pressing operation of the user is excluded.

Second Embodiment

Next, a second embodiment will be described. In the following second embodiment, the same components as those of the first embodiment will be denoted by the same reference signs and a detailed description thereof will be omitted.

Figure 8:
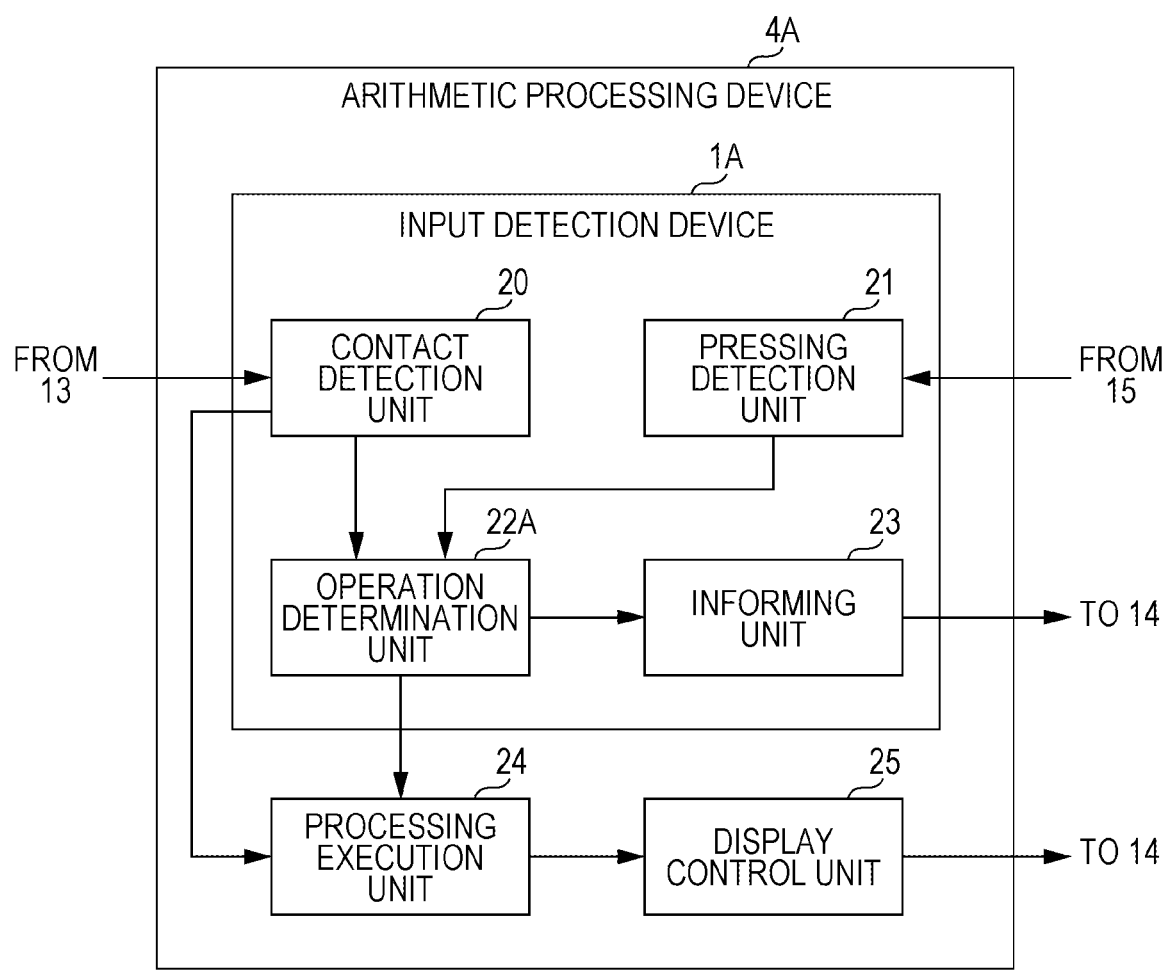
FIG. 8 is a block diagram illustrating an example of functional components of an arithmetic processing device to which an input detection device according to a second embodiment of the present invention is applied.

FIG. 8 is a block diagram illustrating an example of functional components of an arithmetic processing device 4A including an input detection device 1A according to the present embodiment. As apparent from a comparison between FIG. 4 and FIG. 8, the arithmetic processing device 4A according to the present embodiment includes an operation determination unit 22A, instead of the operation determination unit 22 according to the first embodiment.

In the arithmetic processing device 4A according to the present embodiment, processing performed by the operation determination unit 22A after a transition to the special mode is different from that of the first embodiment. Therefore, hereinafter, the processing performed by the operation determination unit 22A after a transition to the special mode will be described. Note that, in a case where the transition to the special mode is performed and in a case where the transition to the special mode is stopped, the operation determination unit 22A notifies the informing unit 23, similarly to the operation determination unit 22 according to the first embodiment. However, in the following description, a description of an informing operation of the operation determination unit 22A with respect to the informing unit 23 will be omitted.

The operation determination unit 22A sets a correction reference value that is more than a determination reference value L1 in a case where a transition to the special mode is performed, monitors whether or not a pressing force detected by a pressing detection unit 21 is equal to or more than the correction reference value in a case where a contact is detected by a contact detection unit 20 after the transition to the special mode, and validates an operation corresponding to the contact when the pressing force detected by the pressing detection unit 21 is equal to or more than the correction reference value. More specifically, the operation determination unit 22A increases the correction reference value in accordance with an increase in pressing force detected by the pressing detection unit 21 after the transition to the special mode. Still more specifically, the operation determination unit 22A increases, in accordance with an increase in pressing force detected by the pressing detection unit 21 after the transition to the special mode, the correction reference value at a rate that is equal to or less than an increasing rate of the pressing force, until the correction reference value reaches a maximum value. Hereinafter, processing performed by the operation determination unit 22A will be described in detail.

Figure 9A:
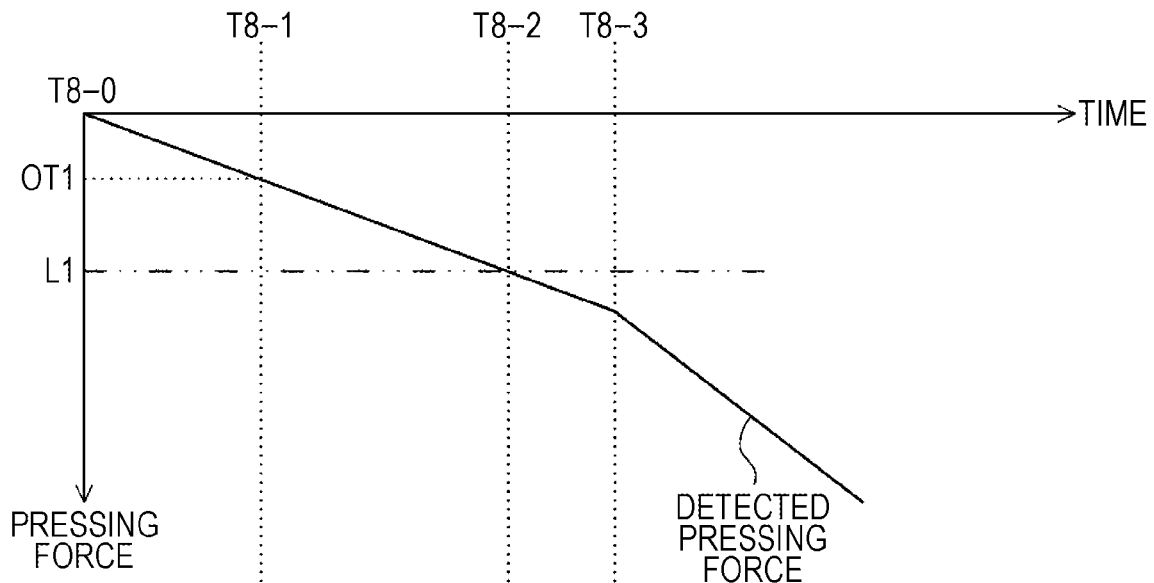
FIGS. 9A and 9B are diagrams illustrating a change of a detected pressing force over time.
Figure 9B:
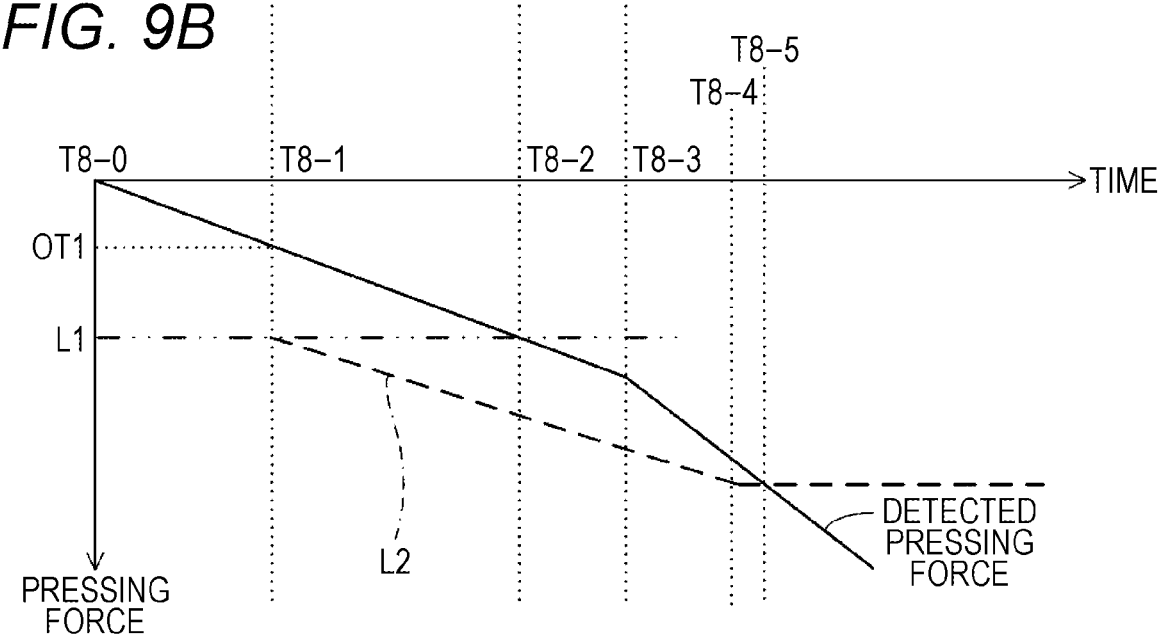

FIGS. 9A and 9B are diagrams each illustrating a change of a detected pressing force over time in a case where a transition to a pressing-detected state occurs before a transition to a contact-detected state. FIG. 9B further illustrates a change of a correction reference value L2 (to be described later). First, a timing at which a detected contact is validated in a case where the correction reference value L2 is not set and a detected contact is uniformly validated when "the contact is detected by the contact detection unit 20 and a detected pressing force is equal to or more than the determination reference value L1" will be described with reference to FIG. 9A.

In a case where a pressing force that is more than a pressing force threshold value OT1 is applied to a frame portion front surface area 10, as illustrated in FIG. 9A, the detected pressing force is gradually increased over time at a substantially constant rate until the detected pressing force reaches a detectable maximum value of the pressing force. In FIG. 9A, a timing T8-0 is a timing at which the pressing starts to be applied to the frame portion front surface area 10, and at a timing T8-2, the detected pressing force is more than the determination reference value L1. A timing T8-3 is a timing at which the contact is detected by the contact detection unit 20, and at a timing T8-3, the detected pressing force is more than the determination reference value L1. Therefore, with the above-described configuration, the detected contact is validated at the timing T8-3 at which the contact is detected by the contact detection unit 20.

In a case where the transition to the special mode is performed, the operation determination unit 22A according to the present embodiment calculates a predicted change amount (predicted increase amount) of the detected pressing force per unit time. Hereinafter, the predicted change amount of the detected pressing force per unit time will be simply referred to as a "predicted change amount". Here, a timing at which the transition to the special mode is performed is a timing at which the detected pressing force reaches the pressing force threshold value OT1. Therefore, the operation determination unit 22A calculates a change rate of the detected pressing force in a period from a time when a transition to the pressing-detected state occurs to a time when the transition to the special mode is performed (to a time when the detected pressing force reaches the pressing force threshold value OT1), and the calculated change rate is regarded as the predicted change amount. As described above, since the detected pressing force is gradually increased at a substantially constant rate over time, after the transition to the special mode is performed, the detected pressing force is predicted to be increased according to the calculated predicted change amount.

After calculating the predicted change amount, the operation determination unit 22A calculates a correction reference value change amount based on the predicted change amount. The correction reference value change amount is a change amount of the correction reference value L2 per unit time at the time of changing the correction reference value L2 over time. The operation determination unit 22A calculates the correction reference value change amount according to a predetermined rule so that an increasing rate of the correction reference value change amount is the same as or slightly less than an increasing rate of the predicted change amount. For example, the operation determination unit 22A calculates the correction reference value change amount so that the increasing rate of the correction reference value change amount is about 9/10 of the increasing rate of the predicted change amount.

Further, after the transition to the special mode, the operation determination unit 22A sets a value of the determination reference value L1 as an initial value of the correction reference value L2, and sets, as the correction reference value L2, a value obtained by changing (increasing) the correction reference value L2 having the initial value according to the correction reference value change amount over time. Accordingly, the correction reference value L2 is gradually increased over time at a rate that is the same as or slightly less than the increasing rate of the detected pressing force. In a case where the correction reference value L2 reaches a maximum value, the operation determination unit 22A stops the increase of the correction reference value L2 over time, and then sets the maximum value as the correction reference value L2.

When the correction reference value L2 is set as described above, the operation determination unit 22A monitors whether or not a transition to a no-detected-pressing state occurs after the transition to the special mode, and monitors whether or not a transition to the contact-detected state occurs. In a case where the transition to the contact-detected state does not occur and the transition to the no-detected-pressing state occurs, the operation determination unit 22A stops the transition to the special mode, and starts execution of the initial monitoring processing again after current states become a no-detected-contact state and the no-detected-pressing state.

Meanwhile, in a case where the transition to the no-detected-pressing state does not occur and the transition to the contact-detected state occurs, the operation determination unit 22A executes the following processing. That is, the operation determination unit 22A monitors whether or not the transition to the no-detected-pressing state occurs, monitors whether or not the transition to the no-detected-contact state occurs while the pressing-detected state is maintained, and further monitors whether or not the detected pressing force is equal to or more than the correction reference value L2. In the present embodiment, a condition that "the detected pressing force is equal to or more than the correction reference value L2" corresponds to "a predetermined condition set in the special mode.".

In a case where the transition to the no-detected-pressing state occurs before the detected pressing force becomes equal to or more than the correction reference value L2, the operation determination unit 22A stops the transition to the special mode.

Meanwhile, in a case where the transition to the no-detected-contact state occurs while the pressing-detected state is maintained before the detected pressing force becomes equal to or more than the correction reference value L2, the operation determination unit 22A monitors whether or not the transition to the contact-detected state occurs again while the pressing-detected state is maintained and monitors whether or not the transition to the no-detected-pressing state occurs. In a case where the transition to the contact-detected state occurs again while the pressing-detected state is maintained, the operation determination unit 22A, again, monitors whether or not the transition to the no-detected-pressing state occurs, monitors whether or not the transition to the no-detected-contact state occurs while the pressing-detected state is maintained, and further monitors whether or not the detected pressing force is equal to or more than the correction reference value L2. Meanwhile, in a case where the transition to the no-detected-pressing state occurs, the operation determination unit 22A stops the transition to the special mode.

Further, in a case where the transition to the no-detected-contact state does not occur while the pressing-detected state is maintained without transitioning to the no-detected-pressing state, and the detected pressing force is equal to or more than the correction reference value L2, the operation determination unit 22A validates the detected contact and outputs, to a processing execution unit 24, validation notification information for notifying that the detected contact has been validated.

Here, in a case where pressing applied to the frame portion front surface area 10 is relevant to a contact on a contact detectable area 8, it is estimated that a time taken until a contact is made on the contact detectable area 8 after the transition to the special mode is shorter than a time taken until the detected pressing force reaches the correction reference value L2 after the transition to the special mode. Particularly, as described in the first embodiment, a representative case where a pressing force is applied to the frame portion front surface area 10 and then a contact is detected by the contact detection unit 20 is a case where the user performs a pressing operation while gripping a display input device 3. In this case, a time taken until the pressing operation starts after the transition of the operation mode to the special mode is short, and it is estimated that the time is certainly shorter than a time taken until a detected pressing force reaches the correction reference value L2 after the transition to the special mode. Therefore, at a point in time at which the transition to the contact-detected state occurs, the detected pressing force is basically less than the correction reference value L2, and the detected contact is not validated immediately when the transition to the contact-detected state occurs, but is validated when a certain time elapses after the transition to the contact-detected state occurs.

A timing at which a detected contact is validated according to the present embodiment will be described with reference to FIG. 9B. In FIG. 9B, a line with alternate long and two short dashes indicates the determination reference value L1, and a broken line indicates the correction reference value L2. In FIG. 9B, at a timing T8-0, pressing starts to be applied to the frame portion front surface area 10, and at a timing T8-1, a detected pressing force is equal to or more than the pressing force threshold value OT1, and the transition of the operation mode to the special mode is performed. As indicated by the broken line in FIG. 9B, the correction reference value change amount is calculated at the timing T8-1, and after the timing T8-1, the correction reference value L2 is changed over time according to the correction reference value change amount until the correction reference value L2 reaches the maximum value.

In FIG. 9B, the current state becomes the contact-detected state at a timing T8-3. At a timing T8-3, the detected pressing force is more than the determination reference value L1, but is less than the correction reference value L2. Then, at a timing T8-4, the correction reference value L2 reaches the maximum value, and is not changed thereafter. Meanwhile, the detected pressing force is increased even after the timing T8-4. Then, at a timing T8-5, the detected pressing force reaches the correction reference value L2. At the timing T8-5, the detected contact is validated by the operation determination unit 22A. As illustrated in FIG. 9B, a time difference occurs between the timing T8-3 at which the current state becomes the contact-detected state, and the timing T8-5 at which the detected contact is validated.

As described above, in the present embodiment, in a case where a transition to the special mode is performed and then the contact is detected by the contact detection unit 20, the operation determination unit 22A sets the correction reference value L2 to a value more than the determination reference value L1. Further, in a case where a contact is detected by the contact detection unit 20 after the transition to the special mode, when a pressing force detected by the pressing detection unit 21 is equal to or more than the correction reference value L2, the operation determination unit 22A validates the contact. As the processing as described above is executed, the following effects are exhibited.

That is, in a case where a contact is detected by the contact detection unit 20 after a transition to the special mode, the detected contact is not validated immediately upon the detection of the contact, but the detected contact is validated only when the contact is continuously made until a detected pressing force becomes equal to or more than the correction reference value L2. Therefore, the detected contact is not instantaneously validated with a light touch, and it is necessary to perform an intentional touch operation, in which the contact is continuously made until the detected pressing force becomes equal to or more than the correction reference value L2 in order to make the detected contact valid, the intentional operation being equivalent to the pressing operation. As a result, according to the present embodiment, even in a case where application of a pressing force is detected by the pressing detection unit 21 before a contact is detected by the contact detection unit 20, it is possible to inhibit the contact from being validated in a manner greatly different from the usual.

Note that, in the present embodiment, the increasing rate of the correction reference value change amount is the same as or slightly less than the increasing rate of the predicted change amount. As a result, the following effects are exhibited. That is, with this configuration, it is possible to constantly maintain a difference between the detected pressing force and the correction reference value L2 in a period from a time when the transition to the special mode is performed to a time when the detected pressing force reaches the maximum value. As a result, a time taken from a time when a contact on the contact detectable area 8 is made to a time when the detected contact is validated can be uniform, regardless of a timing at which the pressing operation is performed. Particularly, as the increasing rate of the correction reference value change amount is slightly less than the increasing rate of the predicted change amount, the difference between the detected pressing force and the correction reference value L2 can be maintained constant, a time taken until the correction reference value L2 reaches the maximum value can be increased in comparison to a case in which the increasing rate of the correction reference value change amount is more than the increasing rate of the predicted change amount, and a period in which the difference between the detected pressing force and the correction reference value L2 is maintained constant can be increased.

Next, an example of an operation of the arithmetic processing device 4A including the input detection device 1A according to the present embodiment will be described with reference to a flowchart FB in FIG. 10. The flowchart FB illustrates an example of an operation of the operation determination unit 22A after a transition of the operation mode to the special mode is performed. The operation determination unit 22A according to the present embodiment executes processing in the flowchart FB, instead of Steps SA9 to SA26 (FIG. 7) of the flowchart FA.

Figure 10:
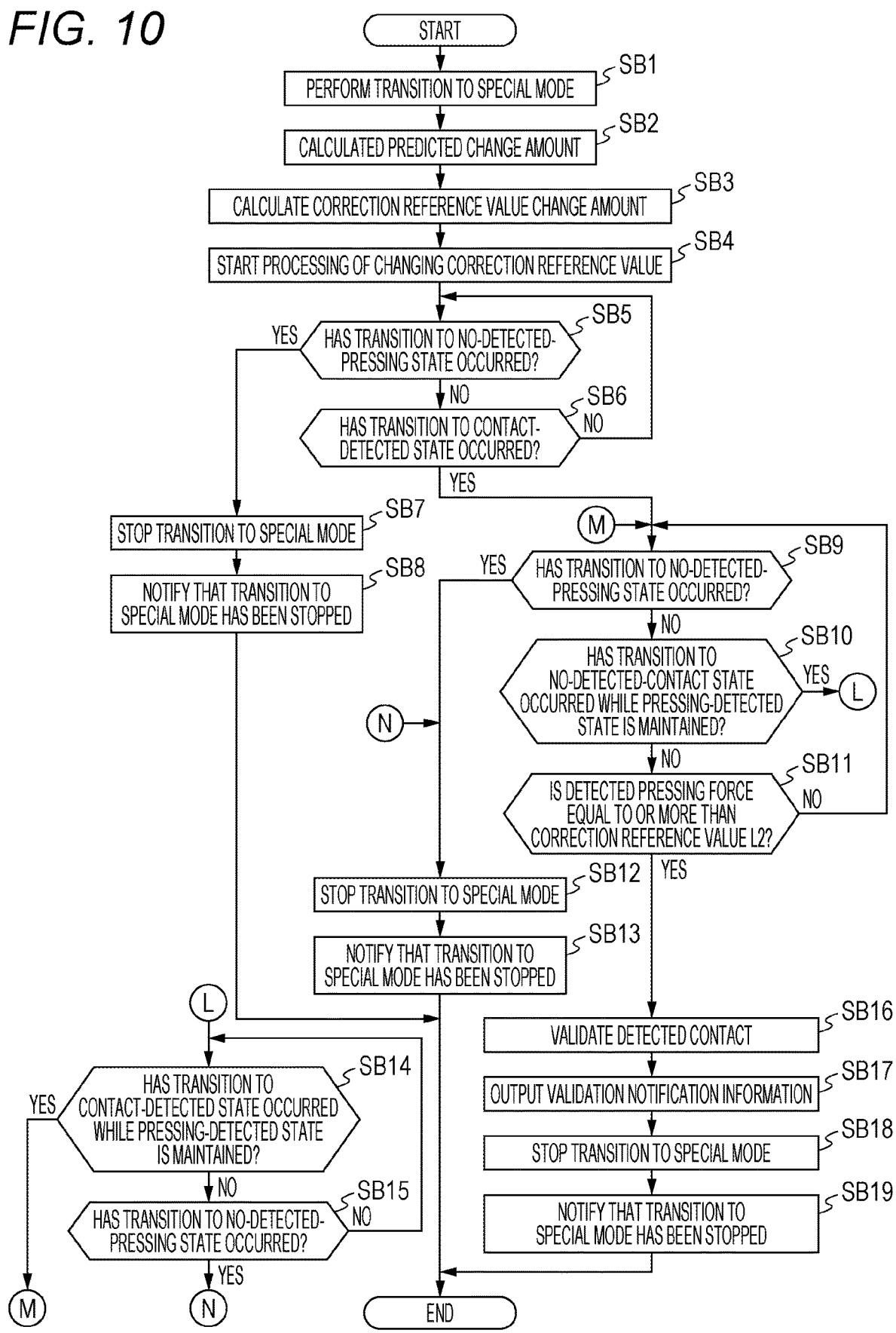
FIG. 10 is a flowchart illustrating an example of an operation of the arithmetic processing device to which the input detection device according to the second embodiment of the present invention is applied.

As illustrated in FIG. 10, the operation determination unit 22A calculates a predicted change amount (predicted increase amount) of a detected pressing force per unit time (Step SB2) after a transition to the special mode (Step SB1). Next, the operation determination unit 22A calculates a correction reference value change amount based on the predicted change amount (Step SB3). Next, the operation determination unit 22A starts processing of changing the correction reference value over time (Step SB4). As described above, the operation determination unit 22A sets a value of the determination reference value L1 as an initial value of the correction reference value L2, and sets, as the correction reference value L2, a value obtained by changing the correction reference value L2 having the initial value according to the correction reference value change amount over time.

Next, the operation determination unit 22A monitors whether or not a transition to the no-detected-pressing state occurs (Step SB5), and monitors whether or not a transition to the contact-detected state occurs (Step SB6). In a case where the transition to the contact-detected state does not occur and the transition to the no-detected-pressing state occurs (Step SB5: YES), the operation determination unit 22A stops the transition to the special mode (Step SB7), and notifies the informing unit 23 that the transition to the special mode has been stopped (Step SB8). After the processing in Step SB8, the flowchart FB ends.

Meanwhile, in a case where the transition to the no-detected-pressing state does not occur and the transition to the contact-detected state occurs (Step SB6: YES), the operation determination unit 22A monitors whether or not the transition to the no-detected-pressing state occurs (Step SB9), monitors whether or not a transition to the no-detected-contact state occurs while the pressing-detected state is maintained (Step SB10), and further monitors whether or not the detected pressing force is equal to or more than the correction reference value L2 (Step SB11).

In a case where the transition to the no-detected-pressing state occurs before the detected pressing force becomes equal to or more than the correction reference value L2 (Step SB9: YES), the operation determination unit 22A stops the transition to the special mode (Step SB12), and notifies the informing unit 23 that the transition to the special mode has been stopped (Step SB13). After the processing in Step SB13, the flowchart FB ends.

Meanwhile, in a case where the transition to the no-detected-contact state occurs while the pressing-detected state is maintained before the detected pressing force becomes equal to or more than the correction reference value L2 (Step SB10: YES), the operation determination unit 22A monitors whether or not the transition to the contact-detected state occurs again while the pressing-detected state is maintained (Step SB14) and monitors whether or not the transition to the no-detected-pressing state occurs (Step SB15). In a case where the transition to the contact-detected state occurs again while the pressing-detected state is maintained (Step SB14: YES), the processing procedure returns to Step SB9. Meanwhile, in a case where the transition to the no-detected-pressing state occurs (Step SB15: YES), the processing procedure proceeds to Step SB12.

In a case where the transition to the no-detected-contact state does not occur while the pressing-detected state is maintained without transitioning to the no-detected-pressing state, and the detected pressing force is equal to or more than the correction reference value L2 (Step SB11: YES), the operation determination unit 22A validates the detected contact (Step SB16) and outputs, to a processing execution unit 24, validation notification information for notifying that the detected contact has been validated (Step SB17). Next, the operation determination unit 22A stops the transition to the special mode (Step SB18), and notifies the informing unit 23 that the transition to the special mode has been stopped (Step SB19). After the processing in Step SB19, the flowchart FB ends.

Modified Example of Second Embodiment

Next, a modified example of the second embodiment will be described. In the second embodiment, the operation determination unit 22A gradually changes the correction reference value over time. In addition, the increasing rate of the correction reference value change amount is the same as or slightly less than the increasing rate of the predicted change amount. In this regard, the correction reference value may be set to the maximum value of the correction reference value or a fixed value that is smaller than the maximum value, rather than a variable value that changes over time. Further, the increasing rate of the correction reference value change amount may be more than the increasing rate of the predicted change amount. Further, the increasing rate of the correction reference value change amount may be set to a predetermined value.

Hereinabove, although the first and second embodiments have been described, the respective embodiments are only an example of an embodiment for carrying out the present invention.

For example, in the respective embodiments, although a form in which the display input device 3 is provided in the vehicle has been described in detail with reference to FIGS. 1A to 2, the form in which the display input device 3 is provided is not limited thereto. As an example, the display input device 3 may be used while being set in the housing space 5. Even in this case, since the frame portion front surface area 10 is exposed in a contactable state, a situation in which a pressing force is applied to the frame portion front surface area 10 before a contact on the contact detectable area 8 is made can occur. Further, the input detection device 1 or 1A need not necessarily be a device provided in a vehicle.

Further, in the first embodiment, some or all of the processing described as being executed by the functional blocks of the input detection device 1 may be executed by the input detection device 1 and an external device in cooperation with each other. In this case, the input detection device 1 and the external device function as the "input detection device" in cooperation with each other. As an example, some or all of the processing performed by the operation determination unit 22 may be executed by a cloud server that can perform communication with the input detection device 1 through a network. The same applies to the second embodiment.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An input detection device including a contact detection unit configured to detect a contact on a contact detectable area and a contact position of the contact, and a pressing detection unit configured to detect application of a pressing force to a pressing detectable area including the contact detectable area and the pressing force, the input detection device comprising:
an operation determination unit configured to validate a contact detected by the contact detection unit in a case where application of a pressing force is detected by the pressing detection unit after the contact is detected by the contact detection unit and the pressing force is equal to or more than a determination reference value, and configured to perform a transition to a special mode in a case where application of a pressing force is detected by the pressing detection unit before a contact is detected by the contact detection unit, monitor whether or not a predetermined condition set in the special mode is satisfied in a case where a contact is detected by the contact detection unit after the transition to the special mode, and validate the contact when the predetermined condition is satisfied.

2. The input detection device according to claim 1, wherein
the operation determination unit monitors, in a case where a contact is detected by the contact detection unit after a transition to the special mode, whether or not a duration of the contact is equal to or more than a predetermined time, and validates the contact when the duration of the contact is equal to or more than the predetermined time regardless of a pressing force of the contact at that time.

3. The input detection device according to claim 1, wherein
the operation determination unit monitors, in a case where a contact is detected by the contact detection unit after a transition to the special mode, whether or not a duration of the contact is equal to or more than a predetermined time, and validates the contact in a case where a pressing force is equal to or more than a predetermined value when the duration of the contact is equal to or more than the predetermined time, or in a case where the pressing force is equal to or more than the predetermined value after the duration of the contact becomes equal to or more than the predetermined time.

4. The input detection device according to claim 1, wherein
the operation determination unit sets a correction reference value that is more than the determination reference value in a case where a transition to the special mode is performed, and monitors whether or not a pressing force detected by the pressing detection unit is equal to or more than the correction reference value in a case where a contact is detected by the contact detection unit after the transition to the special mode, and validates the contact when the pressing force detected by the pressing detection unit is equal to or more than the correction reference value.

5. The input detection device according to claim 4, wherein the operation determination unit increases the correction reference value in accordance with an increase in pressing force detected by the pressing detection unit after a transition to the special mode.

6. The input detection device according to claim 5, wherein the operation determination unit increases, in accordance with an increase in pressing force detected by the pressing detection unit after a transition to the special mode, the correction reference value at a rate that is equal to or less than an increasing rate of the pressing force, until the correction reference value reaches a maximum value.

7. The input detection device according to claim 1, wherein in a case where application of a pressing force is detected by the pressing detection unit before a contact is detected by the contact detection unit, the operation determination unit performs a transition to the special mode when the pressing force detected by the pressing detection unit is equal to or more than a threshold value, or when a time elapsed from the application of the pressing force is equal to or more than a threshold value.

8. The input detection device according to claim 1, further comprising an informing unit configured to inform, when a transition to the special mode has been performed, that the transition to the special mode has been performed.

9. The input detection device according to claim 1, wherein
the contact detectable area is a largest area in which a contact is detectable on a front surface of a display input device mounted in a vehicle, and
the pressing detectable area is an area including the contact detectable area and a frame-shaped area surrounding the contact detectable area.

10. The input detection device according to claim 9, wherein the display input device includes a plate-shaped casing, and is mounted on the vehicle in a state in which a side surface of the casing is exposed.

11. An input detection method performed by an input detection device including a contact detection unit configured to detect a contact on a contact detectable area and a contact position of the contact, and a pressing detection unit configured to detect application of a pressing force to a pressing detectable area including the contact detectable area and the pressing force, the input detection method comprising:
a first step of monitoring, by an operation determination unit of the input detection device, whether or not a contact is detected by the contact detection unit, and whether or not application of a pressing force is detected by the pressing detection unit; and
a second step of executing, by the operation determination unit of the input detection device, processing based on a result of the first step, wherein
in the second step, the operation determination unit validates a contact detected by the contact detection unit in a case where application of a pressing force is detected by the pressing detection unit after the contact is detected by the contact detection unit and the pressing force is equal to or more than a determination reference value, performs a transition to a special mode in a case where application of a pressing force is detected by the pressing detection unit before a contact is detected by the contact detection unit, monitors whether or not a predetermined condition set in the special mode is satisfied in a case where a contact is detected by the contact detection unit after the transition to the special mode, and validates the contact when the predetermined condition is satisfied.

12. The input detection method according to claim 11, wherein
the operation determination unit monitors, in a case where a contact is detected by the contact detection unit after a transition to the special mode, whether or not a duration of the contact is equal to or more than a predetermined time, and validates the contact when the duration of the contact is equal to or more than the predetermined time regardless of a pressing force of the contact at that time.

13. The input detection method according to claim 11, wherein
the operation determination unit monitors, in a case where a contact is detected by the contact detection unit after a transition to the special mode, whether or not a duration of the contact is equal to or more than a predetermined time, and validates the contact in a case where a pressing force is equal to or more than a predetermined value when the duration of the contact is equal to or more than the predetermined time, or in a case where the pressing force is equal to or more than the predetermined value after the duration of the contact becomes equal to or more than the predetermined time.

14. The input detection method according to claim 11, wherein
the operation determination unit sets a correction reference value that is more than the determination reference value in a case where a transition to the special mode is performed, and monitors whether or not a pressing force detected by the pressing detection unit is equal to or more than the correction reference value in a case where a contact is detected by the contact detection unit after the transition to the special mode, and validates the contact when the pressing force detected by the pressing detection unit is equal to or more than the correction reference value.

15. The input detection method according to claim 14, wherein the operation determination unit increases the correction reference value in accordance with an increase in pressing force detected by the pressing detection unit after a transition to the special mode.

16. The input detection method according to claim 15, wherein the operation determination unit increases, in accordance with an increase in pressing force detected by the pressing detection unit after a transition to the special mode, the correction reference value at a rate that is equal to or less than an increasing rate of the pressing force, until the correction reference value reaches a maximum value.

17. The input detection method according to claim 11, wherein in a case where application of a pressing force is detected by the pressing detection unit before a contact is detected by the contact detection unit, the operation determination unit performs a transition to the special mode when the pressing force detected by the pressing detection unit is equal to or more than a threshold value, or when a time elapsed from the application of the pressing force is equal to or more than a threshold value.

18. The input detection method according to claim 11, further comprising
informing, by an informing unit, when a transition to the special mode has been performed, that the transition to the special mode has been performed.

19. The input detection method according to claim 11, wherein
the contact detectable area is a largest area in which a contact is detectable on a front surface of a display input device mounted in a vehicle, and
the pressing detectable area is an area including the contact detectable area and a frame-shaped area surrounding the contact detectable area.

20. The input detection method according to claim 19, wherein the display input device includes a plate-shaped casing, and is mounted on the vehicle in a state in which a side surface of the casing is exposed.

* * * * *